(12) United States Patent
Lee et al.

(10) Patent No.: US 9,126,338 B2
(45) Date of Patent: Sep. 8, 2015

(54) ROBOT SYSTEM AND METHOD FOR DRIVING THE SAME

(71) Applicant: SAMSUNG TECHWIN CO., LTD., Changwon (KR)

(72) Inventors: Jin-han Lee, Changwon (KR); Yang-hyun Kim, Changwon (KR); Ki-sung Kim, Changwon (KR)

(73) Assignee: Hanwha Techwin Co., Ltd., Changwon (KR)

( * ) Notice: Subject to any disclaimer, the term of this patent is extended or adjusted under 35 U.S.C. 154(b) by 196 days.

(21) Appl. No.: 13/886,432

(22) Filed: May 3, 2013

(65) Prior Publication Data
US 2014/0052296 A1 Feb. 20, 2014

(30) Foreign Application Priority Data
Aug. 16, 2012 (KR) .................. 10-2012-0089668

(51) Int. Cl.
*B25J 9/16* (2006.01)
*G05D 1/02* (2006.01)
(52) U.S. Cl.
CPC ............. *B25J 9/1697* (2013.01); *G05D 1/024* (2013.01); *G05D 1/027* (2013.01); *G05D 1/0272* (2013.01); *G05B 2219/40298* (2013.01)
(58) Field of Classification Search
USPC ............ 700/250, 253, 254, 259; 901/1
See application file for complete search history.

(56) References Cited

U.S. PATENT DOCUMENTS

| 5,758,298 | A  | * | 5/1998  | Guldner .................. 701/23 |
| 6,574,361 | B1 | * | 6/2003  | Kawakami et al. .......... 382/154 |
| 7,570,791 | B2 |   | 8/2009  | Frank et al. |
| 8,340,818 | B2 | * | 12/2012 | Pitzer ..................... 700/253 |
| 8,688,275 | B1 | * | 4/2014  | LaFary et al. ............... 700/255 |
| 8,831,778 | B2 | * | 9/2014  | Pitzer ..................... 700/253 |
| 2005/0228539 | A1 | * | 10/2005 | Takenaka et al. .......... 700/245 |
| 2010/0274387 | A1 | * | 10/2010 | Pitzer ..................... 700/246 |
| 2013/0060382 | A1 | * | 3/2013  | Pitzer ..................... 700/258 |

FOREIGN PATENT DOCUMENTS

| JP | 2008-20993 A | 1/2008 |
| KR | 10-2006-0072269 A | 6/2006 |
| KR | 10-1202108 B1 | 11/2012 |

OTHER PUBLICATIONS

Kim, Min-Sik, "A Study on Guidance Method of Pedestrian Assistant Robot for the Elderly," Information and Communication Technology, Technology and Energy, Korea Polytechnic University, 2005, 12, pp. 1-53.

* cited by examiner

*Primary Examiner* — Jason Holloway
(74) *Attorney, Agent, or Firm* — Sughrue Mion, PLLC

(57) ABSTRACT

Provided is a method of driving a system for a robot including obtaining scan data which includes information about at least one of a coordinate and a direction of the robot, estimating a plurality of location changes of the robot by matching a plurality of consecutive scan data pairs of the obtained scan data, generating a path of the robot by connecting the estimated location changes, estimating a position of a corrected instantaneous center of rotation (ICR), and correcting the plurality of consecutive scan data pairs based on the corrected ICR.

19 Claims, 10 Drawing Sheets

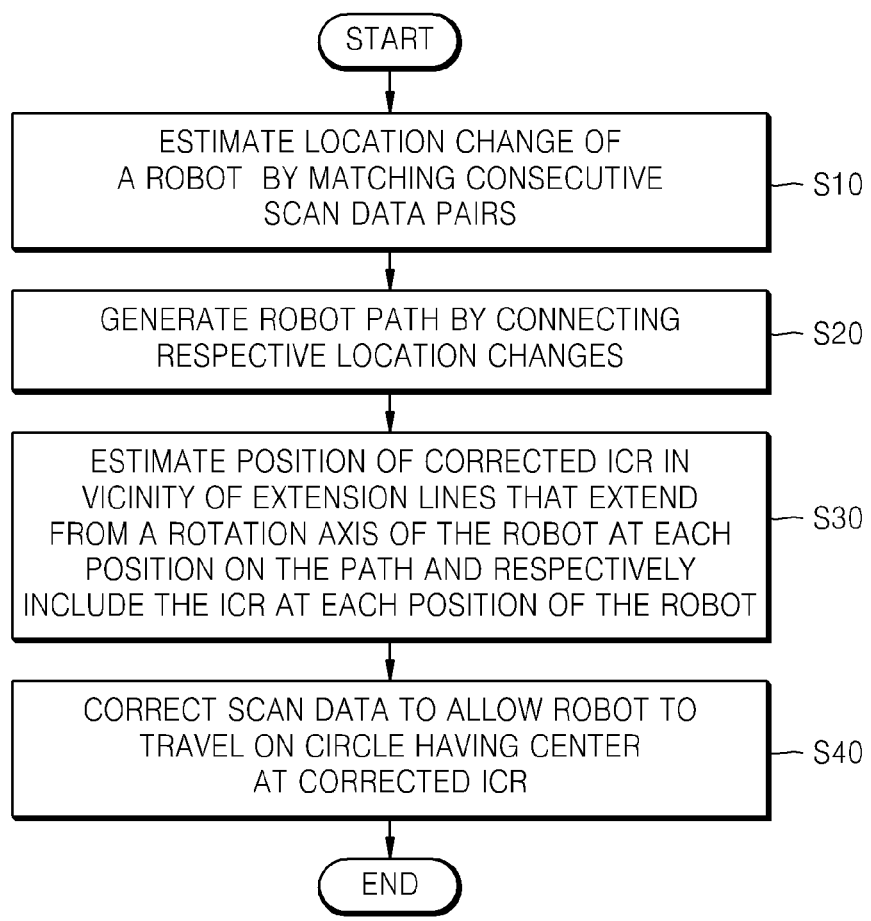

ROBOT SYSTEM AND METHOD FOR DRIVING THE SAME

CROSS-REFERENCE TO RELATED PATENT APPLICATION

This application claims priority from Korean Patent Application No. 10-2012-0089668, filed on Aug. 16, 2012, in the Korean Intellectual Property Office, the disclosure of which is incorporated herein by reference in its entirety.

BACKGROUND

1. Field

Apparatuses and methods consistent with exemplary embodiments relate to a robot system and a method for driving the same, and more particularly, to a robot system for correcting a location of the robot by using the Ackerman steering method, and a method for driving the robot system using the same.

2. Description of the Related Art

Locating a mobile robot is essential when the mobile robot performs a given job. Estimation of a robot location by using a laser scanner is one of the widely known methods in the field of mobile robots. In the related art, only two scan data acquired by employing the laser scanner are used for estimating a location change of a robot. However, in the related art, no additional information that may be available is used in conjunction with the two scan data. Thus, improving the accuracy of estimating a location change of the mobile robot may not be possible because the available additional information is not used.

SUMMARY

One or more exemplary embodiments provide a robot with improved accuracy of estimating a location of the robot when using the Ackerman steering method to accurately follow a travel path, and a method for driving the robot.

According to an aspect of an exemplary embodiment, there is provided a method of driving a robot including: obtaining scan data which includes information about at least one of a coordinate and a direction of the robot; estimating a plurality of location changes of the robot by matching a plurality of consecutive scan data pairs of the obtained scan data, generating a path of the robot by connecting the estimated location changes, estimating a position of a corrected instantaneous center of rotation (ICR), and correcting the plurality of consecutive scan data pairs based on the corrected ICR.

The position of the corrected ICR is disposed in a vicinity of a plurality of extension lines that extends from a rotation axis of the robot at each position on the generated path, and each of the extension lines comprises an ICR for the each position of the robot.

A previous position of the corrected plurality of consecutive scan data pairs may be used for estimating a next location change of the robot.

In the estimating of the plurality of location changes, a relative location change of one scan data may be estimated based on another earlier scan data with respect to time among the consecutive scan data pairs.

The generating of the path of the robot may include setting a reference point of the robot at a predetermined time, and generating the path of the robot by connecting the estimated location changes with respect to the reference point.

The estimating of the position of the corrected ICR may include generating a plurality of extension lines, each includes an ICR of the robot at each position on the generated path, and estimating the position of the corrected ICR at a point of the closet distance from the plurality of extension lines.

The correcting of the plurality of consecutive scan data pairs may include changing the ICR of the robot at each position on the path to the corrected ICR.

The correcting of the plurality of consecutive scan data pairs may also include changing a position of the scan data.

The correcting of the plurality of consecutive scan data pairs may also include changing a direction of the scan data.

The correcting of the plurality of consecutive scan data pairs may also include changing a position and a direction of the scan data.

Before the estimating of the plurality of location changes, the method may further include sensing a travel direction of the robot by using a gyro sensor; detecting a travel distance of the robot by using en encoder; and correcting a location and a direction of the robot by using the travel direction and the travel distance.

The scan data is obtained from a space where the robot moves using a signal emitted from and received by the robot after the signal is reflected from an object around the robot.

The method may further include setting a starting point during the matching of the plurality of consecutive scan data pairs based on data of the corrected location and direction of the robot.

the plurality of location changes may be estimated from data of the corrected location and direction and the plurality of consecutive scan data pairs.

According to an aspect of another exemplary embodiment, there is provided a system for a robot including: a distance measurement unit which obtains scan data including information about at least one of a coordinate and a direction of the robot; a location change estimation unit which estimates a plurality of location changes of the robot by matching a plurality of consecutive scan data pairs of the obtained scan data; a path generation unit which generates a path of the robot by connecting the estimated location changes; a corrected instantaneous center of rotation (ICR) estimation unit which estimates a position of a corrected ICR; and a primary correction unit which corrects and outputs the plurality of consecutive scan data pairs based on the corrected ICR.

The position of the corrected ICR is disposed in a vicinity of a plurality of extension lines that extends from a rotation axis of the robot at each position on the generated path and each of the extension lines comprises an ICR for the each position of the robot.

The corrected plurality of consecutive scan data pairs output from the primary correction unit may be an input for the location change estimation unit.

The location change estimation unit may estimate a relative location change of one scan data based on another earlier scan data with respect to time among the consecutive scan data pairs.

The path generation unit may set a reference point of the robot at a predetermined time and generate the path of the robot by connecting the estimated location changes with respect to the reference point.

The corrected ICR estimation unit may generate a plurality of extension lines, each including an ICR of the robot, at each position on the generated path and estimates the position of the corrected ICR at a point of the closest distance from the plurality of extension lines.

The correction unit may change at least one of a position and a direction of the plurality of consecutive scan data pairs.

The system for a robot may further include a gyro sensor which senses a travel direction of the robot; an encoder which detects a travel distance of the robot; and a secondary correction unit which corrects a location and a direction of the robot based on the travel direction and the travel distance and outputs the corrected location and direction of the robot to the location change estimation unit.

According to an aspect of another exemplary embodiment, there is provided a non-transitory computer-readable recording medium having recorded thereon a program for executing a method of driving a robot system by obtaining scan data which includes information about at least one of a coordinate and a direction of the robot; estimating a plurality of location changes of the robot by matching a plurality of consecutive scan data pairs of the obtained scan data; generating a path of the robot by connecting the estimated location changes; estimating a position of a corrected instantaneous center of rotation (ICR); and correcting the plurality of consecutive scan data pairs based on the corrected ICR.

BRIEF DESCRIPTION OF THE DRAWINGS

The above and/or other aspects will become more apparent by describing in detail exemplary embodiments with reference to the attached drawings, in which:

FIG. 11 is a flowchart for explaining a method of driving a robot system according to an exemplary embodiment.

DETAILED DESCRIPTION

Figure 1:
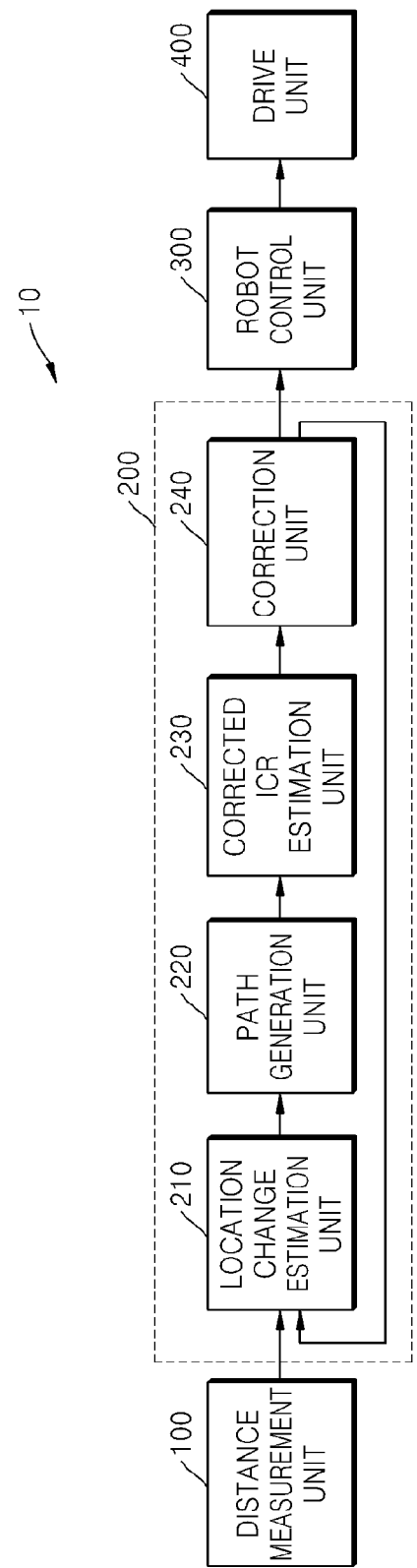
FIG. 1 is a block diagram schematically illustrating a structure of a robot system according to an exemplary embodiment.

As the inventive concept allows for various changes and numerous exemplary embodiments, particular exemplary embodiments will be illustrated in the drawings and described in detail in the written description. However, this is not intended to limit the inventive concept to particular modes of practice, and it is to be appreciated that all changes, equivalents, and substitutes that do not depart from the spirit and technical scope of the inventive concept are encompassed in the exemplary embodiments. In the description of the exemplary embodiments, certain detailed explanations of related art are omitted when it is deemed that they may unnecessarily obscure the essence of the inventive concept. Throughout the specification, like reference numerals in the drawings denote like elements, and thus their description will be omitted.

Terms such as "first" and "second" are used herein merely to describe a variety of constituent elements, but the constituent elements are not limited by these terms. These terms are used only for the purpose of distinguishing one constituent element from another constituent element.

The terms used in the present specification are merely used to describe particular exemplary embodiments, and are not intended to limit the inventive concept. An expression used in the singular encompasses the expression used in the plural, unless it has a clearly different meaning in the context. In the present specification, it is to be understood that terms such as "including" or "having," etc. are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The inventive concept may be described in terms of functional block components and various processing steps. Such functional blocks may be realized by any number of hardware and/or software components configured to perform the specified functions. For example, exemplary embodiments may employ various integrated circuit components, e.g., memory elements, processing elements, logic elements, look-up tables, and the like, which may carry out a variety of functions under the control of one or more microprocessors or other control devices. Similarly, where the elements of the exemplary embodiments are implemented using software programming or software elements, the exemplary embodiments may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the exemplary embodiments may employ any number of conventional techniques for electronics configuration, signal processing and/or control, data processing and the like. The words "mechanism" and "element" are used broadly and are not limited to mechanical or physical exemplary embodiments, but may include software routines in conjunction with processors, etc.

FIG. 1 is a block diagram schematically illustrating a structure of a robot system 10 according to an exemplary embodiment. Referring to FIG. 1, the robot system 10 according to the exemplary embodiment includes a distance measurement unit 100, a location correction unit 200, a robot control unit 300, and a drive unit 400. In the exemplary embodiment, the location correction unit 200 includes a location change estimation unit 210, a path generation unit 220, a corrected instantaneous center of rotation (ICR) estimation unit 230, and a correction unit 240.

Figure 2A:
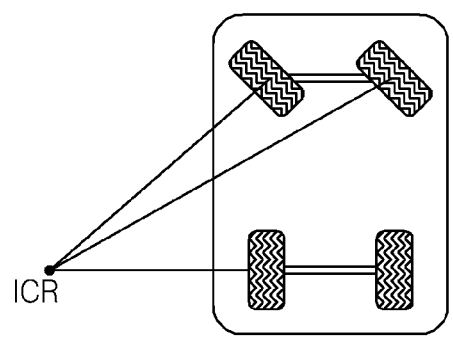
FIGS. 2A and 2B are views for explaining the Ackerman steering method as a traveling principle of a robot system of FIG. 1 according to an exemplary embodiment.
Figure 2B:
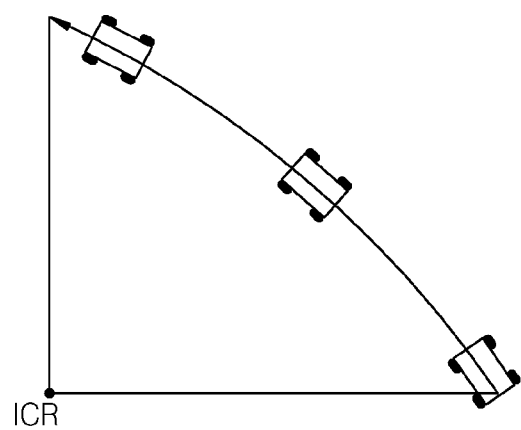

In the present exemplary embodiment, a robot travels according to the Ackerman steering method. FIGS. 2A and 2B are views for explaining the Ackerman steering method. Referring to FIG. 2A, it is assumed in the Ackerman steering method that a robot always rotates around an ICR. Accordingly, the ICR has an infinite value when a robot moves forward or backward without rotating, and thus, the ICR is assumed not to exist. When an ICR point exists in the left area of a robot as illustrated in FIG. 2A, the robot travels circularly to the left around the ICR point as illustrated in FIG. 2B. In the present exemplary embodiment, a location change of the robot is estimated and corrected under the assumption that the same ICR point is maintained for a predetermined time period during which the robot travels.

The distance measurement unit 100 measures a relative distance between the distance measurement unit 100 and an object located in front of the distance measurement unit 100 by calculating a turnaround time of a signal such as a laser signal, an infrared ray, an ultrasonic wave, etc. that is emitted by a source device (not shown) of the robot system 10 and returns to the distance measurement unit 100 after being reflected by the object. When no object exists in front of the robot, the emitted signal does not return to the distance measurement unit 100. When an object exists in front of the robot, the signal received by the distance measurement unit 100 after being reflected by the object may be used to obtain scan data which includes a relative distance between the distance measurement unit 100 and the object.

The location change estimation unit 210 estimates a location change of a robot including the robot system 10 by matching a plurality of consecutive scan data pairs obtained from a space where the robot moves. The location change of the robot may be estimated by using, for example, an interactive closest point (ICP) algorithm. According to the ICP algorithm, a pair of points located at the closest distance between two consecutive scan data is found, and then, a transformation algorithm (i.e. translation and/or rotation) that minimizes a distance between the found pair of points is determined. The above processes may be repeated.

Figure 3A:
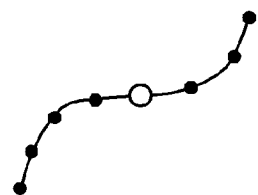
FIGS. 3A, 3B, 3C and 3D are views for explaining an iterative closest point (ICP) algorithm used for estimating a location change of a robot in FIG. 1 according to an exemplary embodiment.
Figure 3B:
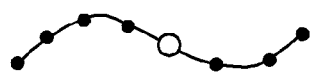
Figure 3C:
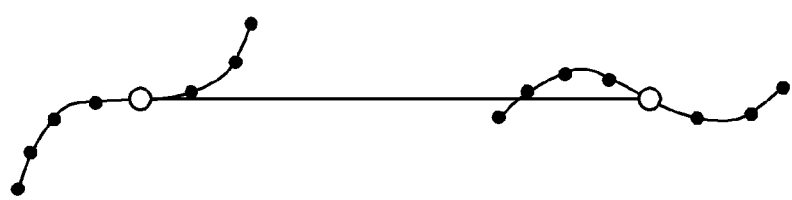
Figure 3D:
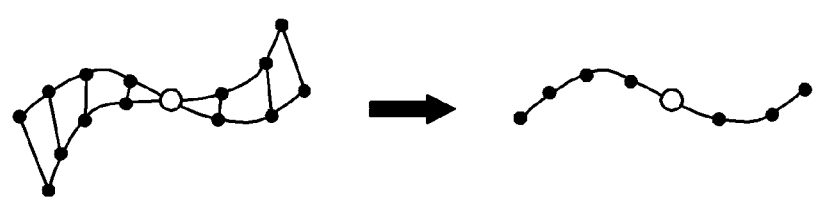

FIGS. 3A, 3B, 3C and 3D are views for explaining the ICP algorithm used for estimating a location change of the robot in FIG. 1. FIG. 3A illustrates scan data obtained at a time point t. FIG. 3B illustrates another scan data obtained at another time point t+1. FIG. 3C illustrates a result of finding of a closest scan data point pair from FIGS. 3A and 3B. FIG. 3D illustrates that one scan data of the closest scan data point pair is rotated around the other scan data for matching purposes. The above processes are repeated until a change in the transformation (translation, rotation) is less than a predetermined critical value, thereby minimizing a location change error.

Figure 4A:
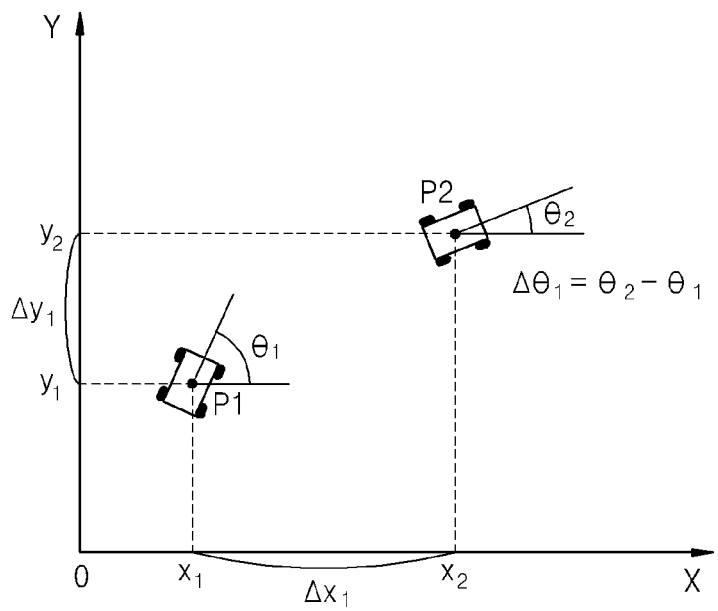
FIGS. 4A and 4B are graphs illustrating estimation of a location change of a robot in FIG. 1 according to an exemplary embodiment.
Figure 4B:
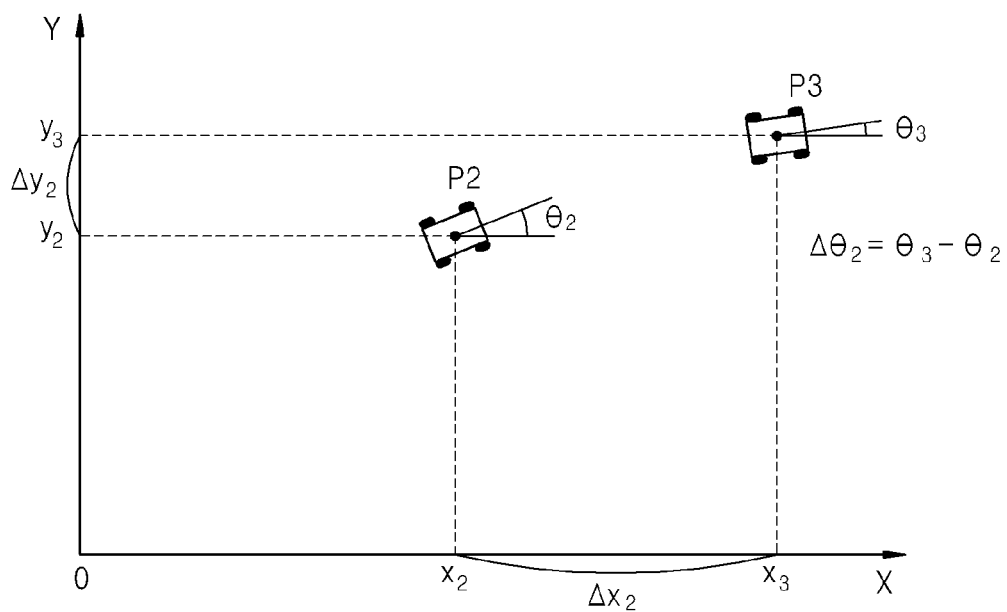

FIGS. 4A and 4B are graphs illustrating estimation of a location change of a robot by the location change estimation unit 210 using the ICP algorithm. In the present exemplary embodiment, a location change of the robot is described with respect to time points t−1, t, and t+1, for example. However, the exemplary embodiment is not limited thereto and a location change of the robot may be estimated with more or less number of time points.

In FIGS. 4A and 4B, X and Y are coordinates of a center point of a robot and θ is a direction angle that indicates the direction of the robot with respect to x-axis in the present exemplary embodiment. The location of the robot includes the coordinates and the direction angle as values to be considered when moving the robot.

FIG. 4A illustrates estimation of a location change of the robot at time t−1 and t. FIG. 4B illustrates estimation of a location change of the robot at time t and t+1. During the estimation of a location change of the robot, the location change estimation unit 210 estimates a change in the relative location of another scan data based on scan data including coordinate information and direction information of earlier scan data with respect to time.

Referring to FIG. 4A, assuming that a position P1 of the robot at time t−1 and a position P2 of the robot at time t are at the closest distance, the location change estimation unit 210 may obtain a relative location change including a coordinate change ($\Delta x_1$, $\Delta y_1$) and a direction change $\Delta \theta_1$ of coordinates ($x_2$, $y_2$) and a direction $\theta_2$ at the position P2 with respect to coordinates ($x_1$, $y_1$) and a direction $\theta_1$ at the position P1.

Also, referring to FIG. 4B, assuming that the position P2 at time t and a position P3 at time t+1 are at the closest distance, the location change estimation unit 210 may obtain a relative location change including a coordinate change ($\Delta x_2$, $\Delta y_2$) and a direction change $\Delta \theta_2$ of coordinates ($x_3$, $y_3$) and a direction $\theta_3$ at the position P3 with respect to the coordinates ($x_2$, $y_2$) and the direction $\theta_2$ at the position P2.

When the estimation of a location change of the robot is completed, the path generation unit 220 generates a travel path of the robot by connecting the respective location changes obtained by the location change estimation unit 210. The path generation unit 220 sets a location of the robot at a predetermined time from among the location changes as a reference point and generates a path of the robot by connecting the location changes with respect to the set reference point.

Figure 5:
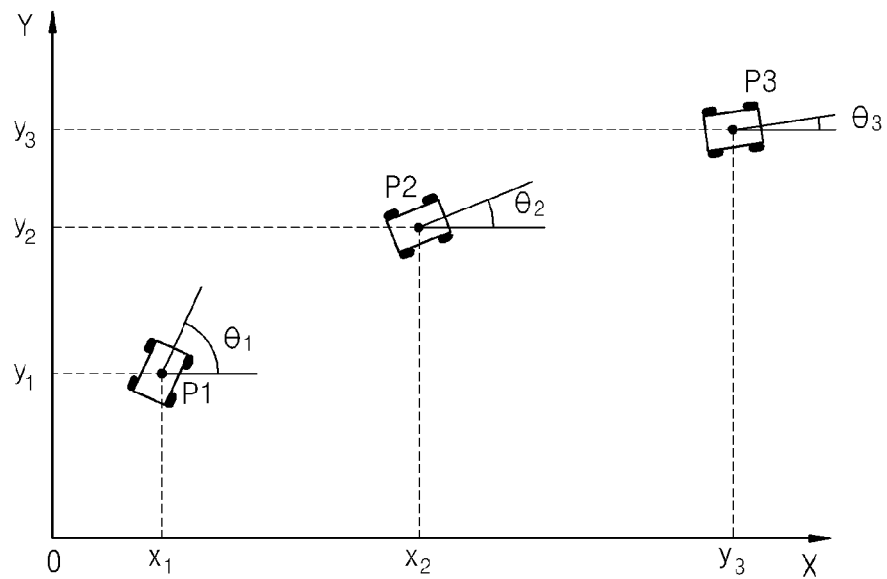
FIG. 5 is a graph showing generation of a robot path by using an estimation result regarding a location change of a robot in FIG. 1 according to an exemplary embodiment.

FIG. 5 is a graph showing generation of a path of the robot by using an estimation result regarding a location change of the robot. Referring to FIG. 5, a route from the position P1 at time t−1 to the position P3 at time t+1 via the position P2 at time t is generated as a travel path of the robot.

A corrected ICR estimation unit 230 estimates a position of a corrected ICR in the vicinity of a plurality of extension lines that extend from a rotation axis of the robot at each position on a travel path of the robot and each of the plurality of extension lines respectively includes an ICR for each position of the robot.

Figure 6:
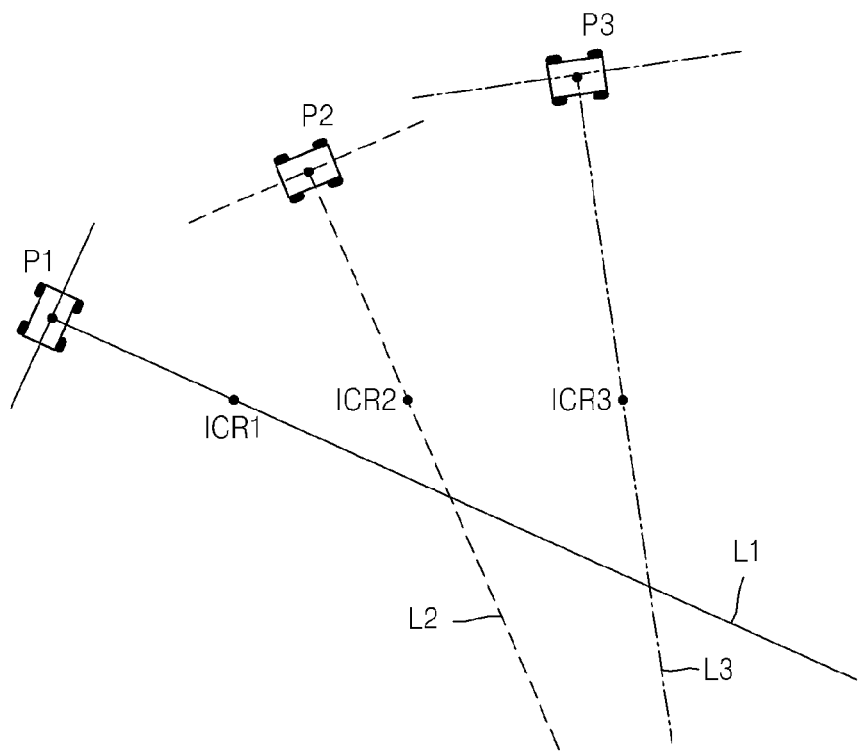
FIG. 6 is a view schematically illustrating traveling of a robot based on the ICP at each position on a generated travel path in FIG. 1 according to an exemplary embodiment.

Prior to the estimation of the corrected ICR location, the motion of the robot is described below with respect to the respective ICR at each position on the travel path in FIG. 6. Referring to FIG. 6, under the assumption that a robot travels according to the Ackerman steering method, the robot rotates around ICR1 at the position P1 at time t−1 and further rotates around ICR2 at the position P2 at time t. Then, the robot rotates around ICR3 at the position P3 at time t+1.

Since the robot rotates around different ICRs (i.e. ICR1, ICR2 and ICR3) at the each respective location on the travel path, unlike the Ackerman steering method in which a robot rotates along a circle generated based on a single ICR on a travel path, the robot does not travel smoothly, and thus, an error may occur when determining the coordinates and/or direction of the robot compared to an actual travel path.

Accordingly, the corrected ICR estimation unit 230 estimates a corrected ICR and generates a corrected circle having the center at the position of the corrected ICR so that the robot may rotate with respect to the corrected circle. Thus, the robot may smoothly travels and errors with respect to the actual travel path may be reduced.

Hereinafter, a method of estimating a corrected ICR is described. As shown in FIG. 6, the corrected ICR estimation unit 230 generates an extension line L1 on which a first ICR ICR1 is located from a rotation axis of the robot at the position P1, an extension line L2 on which a second ICR ICR2 is located from a rotation axis of the robot at the position P2, and an extension line L3 on which a third ICR ICR3 is located from a rotation axis of the robot at the position P3. FIG. 6 illustrates the extension lines L1, L2, and L3 on which the first, second and third ICRs ICR1, ICR2 , and ICR3 are respectively located from the rotation axis of the robot at the positions P1, P2, and P3. As illustrated in FIG. 6, since the extension lines L1, L2, and L3 do not meet one another at a single ICR, estimating of the motion of the robot may not be accurate and an error may occur when compared to an actual travel path.

Figure 7:
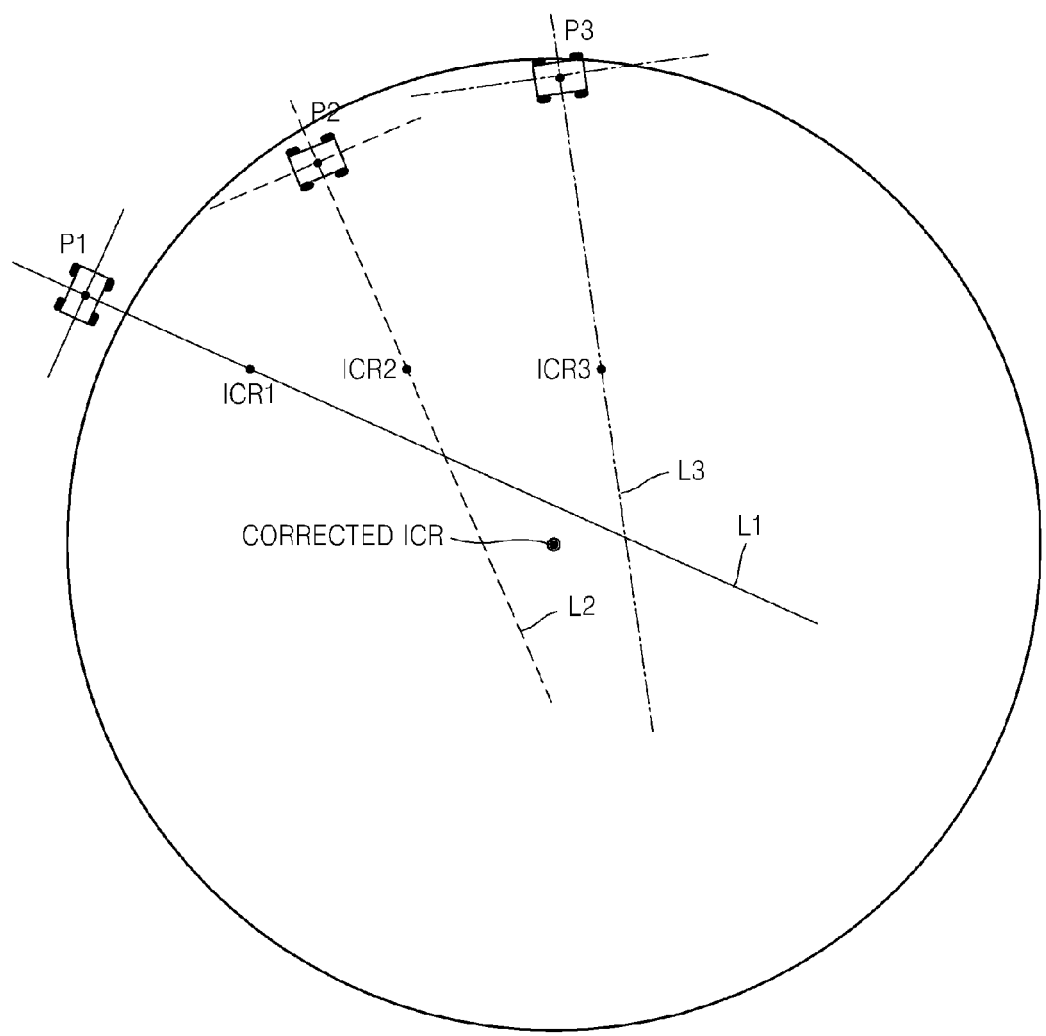
FIG. 7 is a view schematically illustrating estimation of a position of a corrected ICR on the generated travel path of a robot in FIG. 1 according to an exemplary embodiment.

Thus, the corrected ICR estimation unit 230 estimates a point at the closest distance from the extension lines L1, L2, and L3, as a position of a corrected ICR. The corrected ICR estimation unit 230 may estimate a corrected ICR by using a linear equation including the position $P1(x_1, y_1)$, a linear equation including the position $P2(x_2, x_2)$, and a linear equation including the position $P3(x_3, y_3)$. FIG. 7 illustrates that a corrected ICR is estimated at the point at the closest distance from the extension lines L1, L2, and L3.

The correction unit 240 corrects scan data so that the robot travels along a circle having the center at the position of the corrected ICR. For this purpose, the coordinates and/or direction of the robot at the previous location are corrected.

Figure 8:
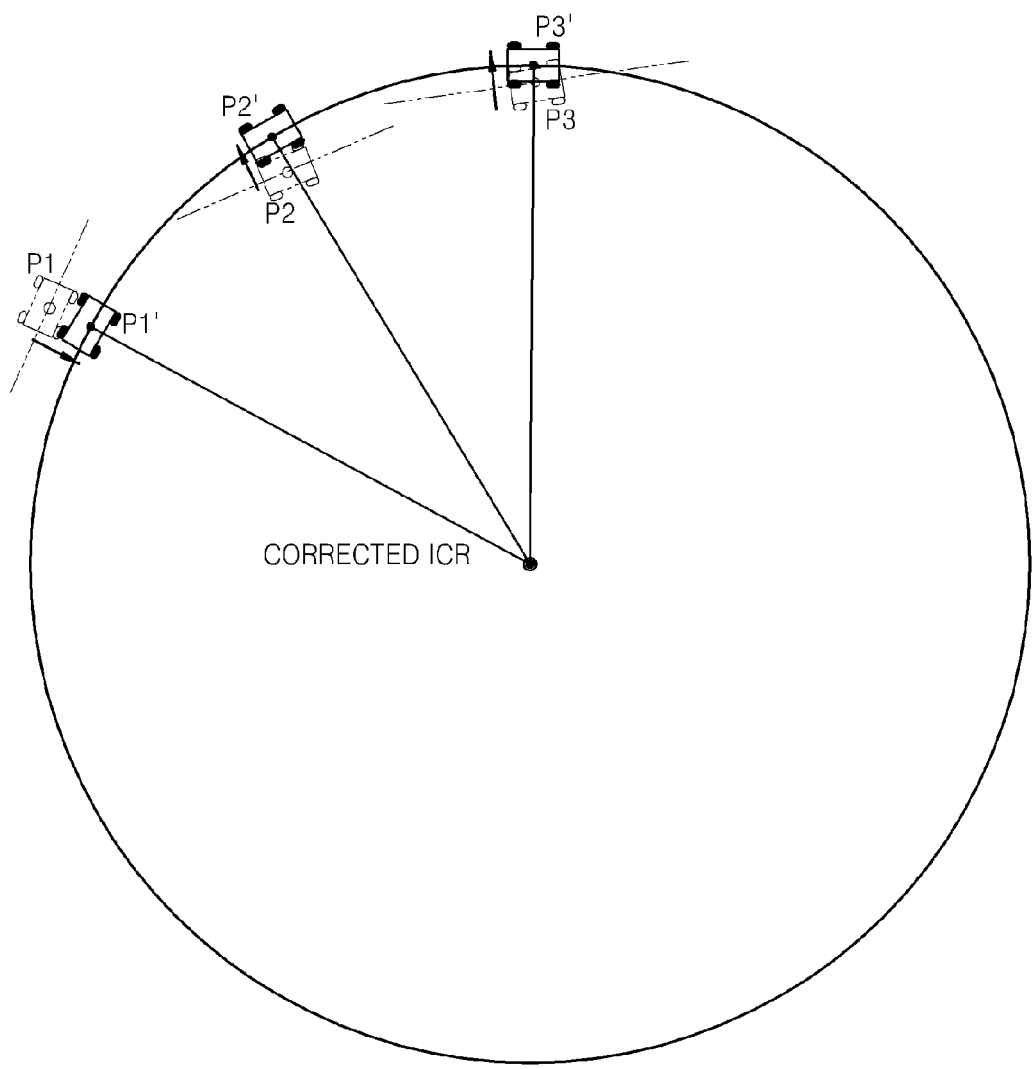
FIG. 8 is a view schematically illustrating movement of a robot according to the corrected ICR in FIG. 1 according to an exemplary embodiment.

FIG. 8 illustrates the robot travelling on a circle having the center at the position of a corrected ICR. Referring to FIG. 8, the coordinates and the direction of the robot has moved from the previous position P1 to a position P1' on the circle having the center at the position of the corrected ICR. That is, the coordinates and direction of the robot are corrected from the previous position P1 to the position P1'. Also, the coordinates and the direction of the robot has moved from the previous position P2 to a position P2' on the circle having the center at the position of the corrected ICR. That is, the coordinates and direction of the robot are corrected from the previous position P2 to the position P2'. Furthermore, the coordinates and the direction of the robot has moved from the previous position P3 to a position P3' on the circle having the center at the position of the corrected ICR. That is, the coordinates and direction of the robot are corrected from the previous position P2 to the position P2'.

As such, since the robot motion is corrected to be on the circle having the center at the position of the corrected ICR, the robot may smoothly travel and an error with respect to an actual travel path may be reduced. The coordinate information and direction information on the corrected travel path are used as corrected scan data for the next location change estimation.

The robot control unit 300 outputs a travel control signal of the robot according to the travel path generated by the location correction unit 200. The drive unit 400 drives the robot to travel according to the travel control signal of the robot control unit 300.

Figure 9:
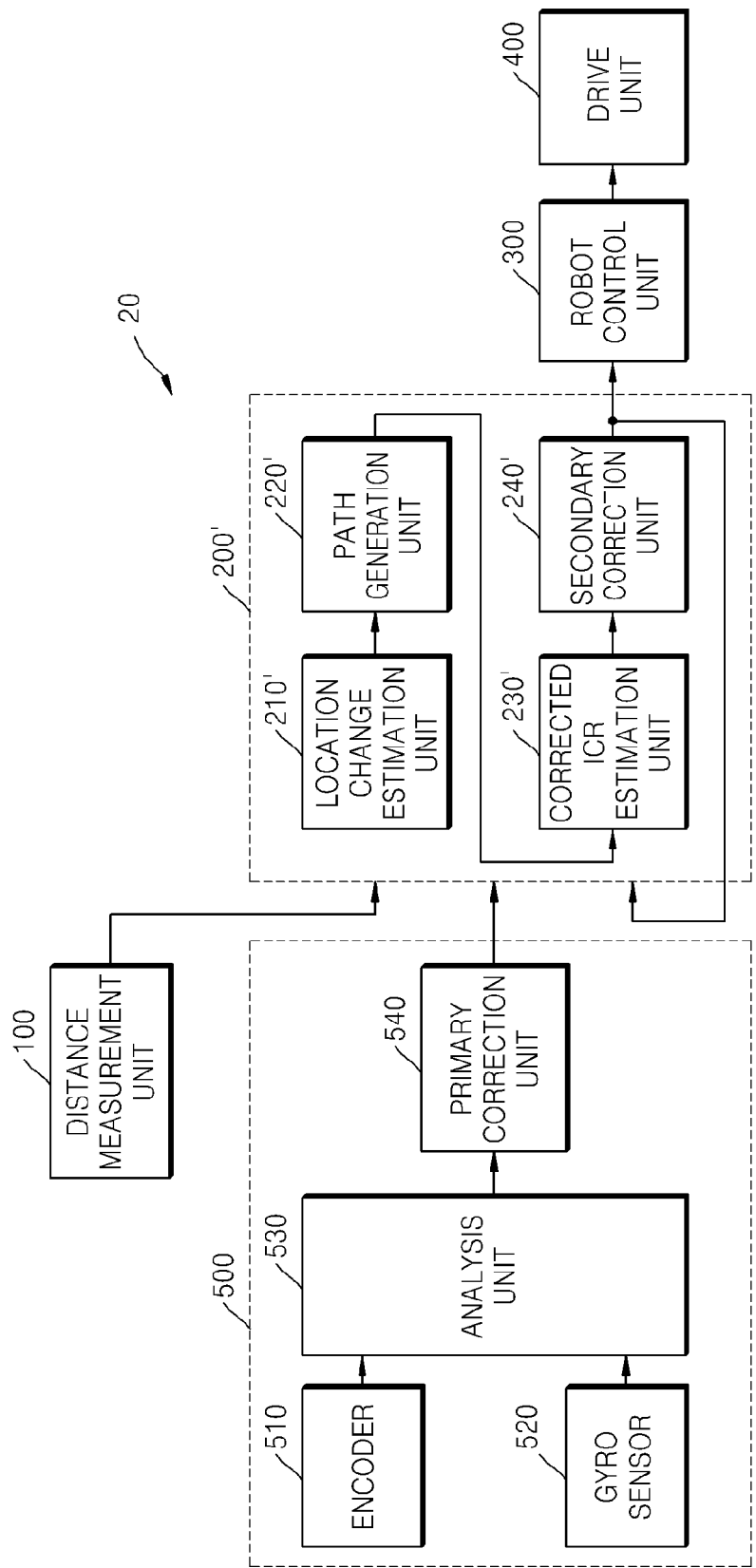
FIG. 9 is a block diagram schematically illustrating a structure of a robot system according to another exemplary embodiment.

FIG. 9 is a block diagram schematically illustrating a structure of a robot system 20 according to another exemplary embodiment. Referring to FIG. 9, the robot system 20 according to the exemplary embodiment includes the distance measurement unit 100, a first correction unit 500, a second correction unit 200', the robot control unit 300, and the drive unit 400. In the present exemplary embodiment, the second correction unit 200' includes a location change estimation unit 210', a path generation unit 220', a corrected ICR estimation unit 230', and a secondary correction unit 240'.

When the ICP algorithm is used, the accuracy thereof increases as a pair of scan data are close to each other. In other words, the scan data pair obtained in the initial ICP process is one of the important factors in the ICP algorithm. As an error in the initially selected scan data pair increases, the ICR algorithm may be trapped at a local minimum.

Figure 10:
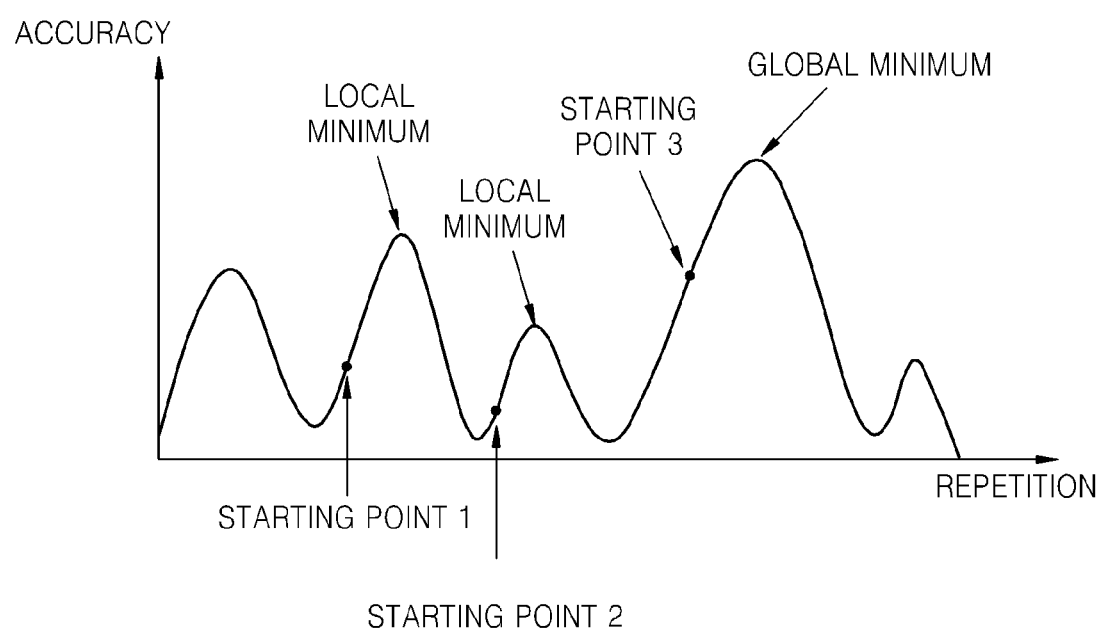
FIG. 10 is a graph showing a local minima of a robot in FIG. 9 according to another exemplary embodiment.

As illustrated in FIG. 10, a starting point of the robot is the closest scan data matching point obtained in the initial ICP process, and an actual matching point is a global minimum position. However, matching may be completed at the local minimum according to the location of the starting point. According to FIG. 10, the probability to be trapped at a local minimum increases when starting point 1 and starting point 2 are used. In more detail, to complete matching at a global minimum, the starting point of robot travel needs to be at starting point 3.

To find an accurate starting point of the robot motion, the first correction unit 500 is used.

Referring to FIG. 9, the first correction unit 500 includes an encoder 510, a gyro sensor 520, an analysis unit 530, and a primary correction unit 540. The encoder 510 is attached to a wheel of a robot to detect a travel distance of the robot by counting the number of rotations of the wheel. The gyro sensor 520 senses accelerations in both a travel direction of the robot and a direction perpendicular to the travel direction. The analysis unit 530 calculates a speed and a rotation angle of the robot by using the travel distance detected by the encoder 510 and a speed and a rotation angle by using the accelerations in both directions sensed by the gyro sensor 520.

The primary correction unit 540 calculates an error-corrected speed and rotation angle of the robot by using the speed and rotation angle output from the analysis unit 530. The primary correction unit 540 calculates a location of the robot by using a Kalman filter with respect to the error-corrected speed and rotation angle. The location of the robot calculated by the primary correction unit 540 is used as a scan data matching starting point.

The distance measurement unit 100 measures a relative distance between the distance measurement unit 100 and an object located in front of the distance measurement unit 100 by calculating a turnaround time of a signal such as a laser signal, an infrared ray, an ultrasonic wave, etc. that is emitted by a source device (not shown) of the robot system 20 and returns to the distance measurement unit 100 after being reflected by the object. When no object exists in front of the robot, the emitted signal does not return to the distance measurement unit 100. When an object exists in front of the robot, the signal received by the distance measurement unit 100 may be used to obtain scan data which includes a relative distance between the distance measurement unit 100 and the object.

The second correction unit 200' estimates a location change by matching of a plurality of consecutive scan data pairs by using the scan data matching starting point output from the first correction unit 500, generates a path of the robot by connecting the respective location changes, estimates a position of a corrected ICR in the vicinity of a plurality of extension lines, each including the ICR of the robot at each position on a travel path, and corrects scan data so that the robot may travel on a circle having the center at the position of the corrected ICR. In the present exemplary embodiment, the second correction unit 200' has the same function as the correction unit 200 of FIG. 1, except for using the scan data matching starting point.

The location change estimation unit 210' estimates a location change by matching of the consecutive scan data pairs obtained from a space where the robot moves by using an ICP algorithm. The path generation unit 220' generates a travel path of the robot by connecting the respective location changes obtained by the location change estimation unit 210'. The path generation unit 220' sets the location of the robot at a particular time among the location changes as a reference point and generates the travel path of the robot by connecting the location changes with respect to a set reference point.

The corrected ICR estimation unit 230' estimates the position of a corrected ICR in the vicinity of extensions lines including ICRs from a rotation axis of a robot at the respective positions on a travel path of the robot. The corrected ICR estimation unit 230' estimates a point at the closest distance from the extension lines L1, L2, and L3 respectively including a first, second and third ICRs ICR1, ICR2, and ICR3 from the rotation axis of the robot at the positions P1, P2, and P3, as a position of a corrected ICR, and corrects scan data so that the robot may travel on a circle having the center at the position of the corrected ICR. With regard to the scan data, only the coordinates or direction of the robot may be corrected, and further, both of the coordinates and direction of the robot may be corrected.

As such, since the travel path of the robot is corrected to be on a circle having the center at the position of the corrected ICR, the robot may smoothly travel and an error with respect to an actual travel path may be reduced. The coordinate information and direction information on the corrected travel path are used as corrected scan data for the next location change estimation. The first correction unit 500 is not operated in the next location change estimation.

The robot control unit 300 outputs a travel control signal of the robot according to the travel path generated by the location correction unit 200. The drive unit 400 drives the robot to travel according to the travel control signal of the robot control unit 300.

FIG. 11 is a flowchart for explaining a method of driving the robot system 10 according to an exemplary embodiment. In the following description, descriptions that are the same as those with regard to FIGS. 1 through 10 will be omitted.

Referring to FIG. 11, the robot system 10 estimates a location change of the robot by matching of a plurality of consecutive scan data pairs obtained from a space where the robot moves (S10). The robot system 10 estimates the location change by receiving scan data obtained by measuring a relative distance between the distance measurement unit 100 and an object located in front of the distance measurement unit 100 by calculating a turnaround time of a beam such as a laser beam, an infrared ray, an ultrasonic wave, etc. that is emitted by a source device (not shown) of the robot system 10 and returns to the distance measurement unit 100 after being reflected by the object, and by finding and matching a pair of points located at the closest distance between two consecutive scan data according to the ICP algorithm. In order to reduce a probability that a scan data matching point of a robot gets trapped at a local minimum, an accurate matching starting point may be calculated by using the encoder 510 and the gyro sensor 520. The location change of the robot is estimated at time t−1, t, and t+1 in the present exemplary embodiment. A relative location change of coordinates ($x_2$, $y_2$) and a direction $\theta_2$ at the position P2 with respect to coordinates ($x_1$, $y_1$) and a direction $\theta_1$ at the position P1 including a coordinate change ($\Delta x_1$, $\Delta y_1$) and a direction change $\Delta\theta_1$, are obtained. Also, a relative location change of coordinates ($x_3$, $y_3$) and a direction $\theta_3$ at the position P3 with respect to the coordinates ($x_2$, $y_2$) and the direction $\theta_2$ at the position P2 including a coordinate change ($\Delta x_2$, $\Delta y_2$) and a direction change $\Delta\theta_2$, are obtained. Thus, the location change is estimated.

When the estimation of the location change of the robot is completed, the robot system 10 generates a travel path of the robot by connecting the respective location changes (S20). The robot system 10 may set the location of the robot at a particular time among the location changes as a reference point and may generate a path of the robot by connecting the location changes with respect to the set reference point. For example, the position P2 at time t and the position P3 at time t+1 based on the position P1 at time t−1 may be generated as points on the travel path of the robot.

When the generation of the travel path of the robot is completed, the robot system 10 estimates the position of a corrected ICR in the vicinity of a plurality of extension lines, each extension line including an ICR and extending from a rotation axis of the robot at each position on a travel path of the robot (S30). In order to estimate the position of a corrected ICR, the extension line L1 including a first ICR ICR1 from the rotation axis of the robot at the position P1 at time t−1 is generated, the extension line L2 including a second ICR ICR2 from the rotation axis of the robot at the position P2 at time t is generated, and the extension line L2 including a third ICR ICR3 from the rotation axis of the robot at the position P3 at time t+1 is generated. Since the extension lines L1, L2, and L3 do not meet one another in a single ICR, the travel of the robot is not smooth and an error occurs when compared to an actual travel path. Thus, a point at the closest distance from the extension lines L1, L2, and L3 is estimated as the position of a corrected ICR.

When the estimation of the position of a corrected ICR is completed, the robot system 10 corrects scan data so that the robot may travel on a circle having the center at the position of the corrected ICR (S40).

During correction of scan data, the coordinates and/or direction of the robot may be corrected to a corrected location from a previous location. As such, since the travel path of the robot is corrected to be a circle having the center at the position of a corrected ICR, the robot may smoothly travels and an error with respect to an actual travel path may be reduced. The coordinate information and direction information on the corrected travel path are used as corrected scan data for the next location change estimation.

As described above, according to the exemplary embodiments, the accuracy of estimating a location of a robot may be improved by using the Ackerman steering method to accurately follow a travel path The exemplary embodiments can be written as computer programs and can be implemented in general-use digital computers that execute the programs using a computer readable recording medium.

The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. (Also, functional programs, codes, and code segments for accomplishing the present invention can be easily construed by programmers skilled in the art to which the present invention pertains.)

While exemplary embodiments have been particularly shown and described above, it will be understood by those skilled in the art that various changes in form and details may be made therein without departing from the spirit and scope of the inventive concept as defined by the appended claims.

What is claimed is:
1. A method of driving a robot, the method comprising:
obtaining scan data which includes information about at least one of a coordinate and a direction of the robot;
estimating a plurality of location changes of the robot by matching a plurality of consecutive scan data pairs of the obtained scan data;
generating a path of the robot by connecting the estimated location changes;
generating a plurality of extension lines, each comprising an instantaneous center of rotation (ICR) from a rotation axis of the robot at each position on the generated path;

estimating the position of a corrected ICR at a point of the closest distance from the plurality of extension lines;

generating a corrected circle having the center at the position of the corrected ICR; and correcting the plurality of consecutive scan data pairs so that the robot may rotate with respect to the corrected circle.

2. The method of claim 1, wherein a previous location of the corrected plurality of consecutive scan data pairs is used for estimating a next location change of the robot.

3. The method of claim 1, wherein in the estimating the plurality of location changes, a relative location change of one scan data is estimated based on another earlier scan data with respect to time among the consecutive scan data pairs.

4. The method of claim 1, wherein the generating the path of the robot comprises:

setting a reference point of the robot at a predetermined time; and generating the path of the robot by connecting the estimated location changes with respect to the reference point.

5. The method of claim 1, wherein the correcting the plurality of consecutive scan data pairs further comprises changing the ICR of the robot at each position on the path to the corrected ICR.

6. The method of claim 1, wherein the correcting the plurality of consecutive scan data further comprises changing a position of the plurality of consecutive scan data pairs.

7. The method of claim 1, wherein the correcting the plurality of consecutive scan data pairs further comprises changing a direction of the plurality of consecutive scan data pairs.

8. The method of claim 1, wherein the correcting the plurality of consecutive scan data pairs further comprises changing a position and a direction of the scan data pairs.

9. The method of claim 1, before the estimating the plurality of location changes, further comprising:

sensing a travel direction of the robot by using a gyro sensor;

detecting a travel distance of the robot by using en encoder; and correcting a location and a direction of the robot by using the travel direction and the travel distance.

10. The method of claim 9, wherein the scan data is obtained, from a space where the robot moves, using a signal emitted from and received by the robot after the signal is reflected from an object around the robot.

11. The method of claim 9 further comprising setting a starting point during the matching of the plurality of consecutive scan data pairs based on data of the corrected location and direction of the robot.

12. The method of claim 9, wherein the plurality of location changes is estimated from data of the corrected location and direction and the plurality of consecutive scan data pairs.

13. A robot comprising:

a distance measurement calculator configured to obtain scan data including information about at least one of a coordinate and a direction of the robot;

a location change estimator configured to estimate a plurality of location changes of the robot by matching a plurality of consecutive scan data pairs of the obtained scan data;

a path generator configured to generate a path of the robot by connecting the estimated location changes;

a corrected instantaneous center of rotation (ICR) estimator configured to generate a plurality of extension lines, each comprising an instantaneous center of rotation (ICR) from a rotation axis of the robot at each position on the generated path and configured to estimate the position of a corrected ICR at a point of the closest distance from the plurality of extension lines; and a primary correction processor configured to generate a corrected circle having the center at the position of the corrected ICR and configured to correct the plurality of consecutive scan data pairs so that the robot may rotate with respect to the corrected circle.

14. The robot of claim 13, wherein the corrected plurality of consecutive scan data pairs output from the primary correction processor is an input for the location change estimator.

15. The robot of claim 13, wherein the location change estimator is configured to estimate a relative location change of one scan data based on another earlier scan data with respect to time among the consecutive scan data pairs.

16. The robot of claim 13, wherein the path generator is configured to set a reference point of the robot at a predetermined time and configured to generate the path of the robot by connecting the estimated location changes with respect to the reference point.

17. The robot of claim 13, wherein the correction processor is configured to change at least one of a position and a direction of the plurality of consecutive scan data pairs.

18. The robot of claim 13, further comprising:

a gyro sensor configured to sense a travel direction of the robot;

an encoder configured to detect a travel distance of the robot; and a secondary correction processor configured to correct a location and a direction of the robot based on the travel direction and the travel distance and configured to output the corrected location and direction of the robot to the location change estimator.

19. A non-transitory computer-readable recording medium having recorded thereon a program for executing a method of driving a robot, the method comprising:

obtaining scan data which includes information about at least one of a coordinate and a direction of the robot;

estimating a plurality of location changes of the robot by matching a plurality of consecutive scan data pairs of the obtained scan data;

generating a path of the robot by connecting the estimated location changes;

generating a plurality of extension lines, each comprising an instantaneous center of rotation (ICR) from a rotation axis of the robot at each position on the generated path;

estimating the position of a corrected ICR at a point of the closest distance from the plurality of extension lines;

generating a corrected circle having the center at the position of the corrected IRC; and correcting the plurality of consecutive scan data pairs so that the robot may rotate with respect to the corrected circle.

* * * * *